(12) United States Patent
Shultz

(10) Patent No.: US 12,480,693 B2
(45) Date of Patent: Nov. 25, 2025

(54) DRY COOLER FOR AN ICE MAKER

(71) Applicant: Mile High Equipment LLC, Denver, CO (US)

(72) Inventor: Nathan Lee Shultz, Aurora, CO (US)

(73) Assignee: MILE HIGH EQUIPMENT LLC, Denver, CO (US)

( * ) Notice: Subject to any disclaimer, the term of this patent is extended or adjusted under 35 U.S.C. 154(b) by 285 days.

(21) Appl. No.: 18/123,247

(22) Filed: Mar. 17, 2023

(65) Prior Publication Data

US 2024/0310089 A1  Sep. 19, 2024

(51) Int. Cl.
*F25B 39/00* (2006.01)
*F25B 39/04* (2006.01)
*F25C 1/00* (2006.01)

(52) U.S. Cl.
CPC ............... *F25B 39/00* (2013.01); *F25C 1/00* (2013.01); *F25B 39/04* (2013.01); *F25B 2339/047* (2013.01); *F25C 2600/04* (2013.01)

(58) Field of Classification Search
CPC .... F25B 39/00; F25B 39/04; F25B 2339/047; F25C 2600/04; F25C 1/00
See application file for complete search history.

(56) References Cited

U.S. PATENT DOCUMENTS

| | | | | |
|---|---|---|---|---|
| 3,280,585 A | * | 10/1966 | Lowe | F25C 1/12 62/352 |
| 3,885,937 A | * | 5/1975 | Norris | F25C 1/12 62/320 |
| 4,020,899 A | * | 5/1977 | Langerock | F28B 1/06 165/DIG. 182 |
| 4,044,568 A | * | 8/1977 | Hagen | F25C 5/10 62/352 |
| 4,262,489 A | * | 4/1981 | Sakamoto | F25C 1/045 62/541 |
| 4,276,751 A | * | 7/1981 | Saltzman | F25C 1/045 62/352 |
| 4,572,785 A | * | 2/1986 | Braaten | C02F 1/22 210/182 |

(Continued)

FOREIGN PATENT DOCUMENTS

| | | | | |
|---|---|---|---|---|
| CN | 202420064 U | | 9/2012 | |
| DE | 102004039777 A1 | * | 5/2006 | ............... A23G 9/04 |

(Continued)

*Primary Examiner* — Nelson J Nieves
(74) *Attorney, Agent, or Firm* — Lempia Summerfield Katz LLC

(57) ABSTRACT

A thermal management device for cooling a coolant for an ice maker that is remote relative to the thermal management device includes a housing, a coolant line through which the coolant is configured to flow, and a fan configured to move air through the housing of the thermal management device. The thermal management device includes a heat exchanger and a pump configured to move the coolant, via the coolant line, through the heat exchanger. The thermal management device includes a pressure sensor configured to determine a pressure of the coolant in the coolant line. A speed of the pump or a speed of the fan is controllable based on the determined pressure, such that heat transfer between the air moved through the housing and the coolant in the coolant line is controllable without a direct electrical connection of the thermal management device to the ice maker.

14 Claims, 6 Drawing Sheets

(56) References Cited

U.S. PATENT DOCUMENTS

| | | | | |
|---|---|---|---|---|
| 4,612,779 A * | 9/1986 | Hatton | ............. | F25C 5/182 241/101.76 |
| 4,864,831 A * | 9/1989 | Hino | ............. | F25D 16/00 62/534 |
| 4,897,099 A * | 1/1990 | Ruff | ............. | F25C 1/12 62/123 |
| 4,899,548 A * | 2/1990 | Dimijian | ............. | F25C 1/12 62/347 |
| 4,903,503 A * | 2/1990 | Meckler | ............. | F24F 3/1417 62/332 |
| 4,941,902 A * | 7/1990 | Ruff | ............. | F25C 1/12 62/532 |
| 4,982,574 A * | 1/1991 | Morris, Jr. | ............. | F25C 5/10 62/155 |
| 5,032,157 A * | 7/1991 | Ruff | ............. | C02F 1/22 62/124 |
| 5,103,653 A * | 4/1992 | Ruff | ............. | C02F 1/22 62/124 |
| 5,289,691 A * | 3/1994 | Schlosser | ............. | F25C 1/12 62/78 |
| 5,381,665 A * | 1/1995 | Tanaka | ............. | F25B 31/008 62/509 |
| 5,987,900 A * | 11/1999 | Love | ............. | F25C 5/185 62/348 |
| 6,093,312 A * | 7/2000 | Boulter | ............. | F25C 5/24 62/343 |
| 6,105,385 A * | 8/2000 | Kato | ............. | F25C 1/12 62/347 |
| 6,196,007 B1 * | 3/2001 | Schlosser | ............. | F25C 5/10 62/352 |
| 11,473,824 B2 * | 10/2022 | Lu | ............. | F25C 1/00 |
| 12,289,869 B2 * | 4/2025 | Gao | ............. | H05K 7/20181 |
| 2009/0288445 A1 * | 11/2009 | Anikhindi | ............. | F25D 15/00 62/529 |
| 2011/0185758 A1 * | 8/2011 | Shimokawa | ............. | H05K 7/20609 62/259.2 |
| 2014/0166240 A1 * | 6/2014 | Carter | ............. | F28C 3/06 165/104.14 |
| 2019/0137158 A1 * | 5/2019 | Goldfarbmuren | ............. | C09K 5/066 |
| 2019/0208668 A1 * | 7/2019 | Tang | ............. | H05K 7/20309 |

FOREIGN PATENT DOCUMENTS

| | | | |
|---|---|---|---|
| JP | H1151523 A | | 2/1999 |
| JP | 2003004348 A | | 1/2003 |
| JP | 2003130507 A | | 5/2003 |
| JP | 2004053168 A | | 2/2004 |
| JP | 2008057862 A | * | 3/2008 |
| JP | 2013024435 A | | 2/2013 |
| KR | 101256415 B1 | | 4/2013 |
| KR | 101264290 B1 | | 5/2013 |
| KR | 101552059 B1 | | 9/2015 |
| KR | 101591510 B1 | | 2/2016 |
| KR | 20160047968 A | | 5/2016 |
| KR | 20210124766 A | | 10/2021 |

* cited by examiner

DRY COOLER FOR AN ICE MAKER

FIELD

The present embodiments relate to a dry cooler for an ice maker and, more specifically, a dry cooler for a water cooled ice maker.

BACKGROUND

Current and upcoming refrigerant regulations with regard to global-warming potential (GWP) have caused the phase down of common refrigerants used in ice makers such as, for example, HFC refrigerants (e.g., R404a and R22). This phase down of common refrigerants may be problematic for, for example, remote cooled ice makers, as few viable refrigerant alternatives exist.

SUMMARY

In one example, a thermal management device for cooling a coolant for an ice maker that is remote relative to the thermal management device includes a housing, a coolant line through which the coolant is configured to flow, and a fan configured to move air through the housing of the thermal management device. The thermal management device includes a heat exchanger and a pump configured to move the coolant, via the coolant line, through the heat exchanger. The heat exchanger is configured to transfer heat from the coolant to the air moved through the housing by the fan. The thermal management device includes a pressure sensor in communication with the pump, the fan, or the pump and the fan. The pressure sensor is configured to determine a pressure of the coolant in the coolant line. A speed of the pump or a speed of the fan is controllable based on the determined pressure, such that heat transfer between the air moved through the housing and the coolant in the coolant line is controllable without a direct electrical connection of the thermal management device to the ice maker.

In one example, the thermal management device is a dry cooler configured to be fluidly connected to but physically remote relative to the ice maker. In one example, the coolant is a mixture of glycol and water.

In one example, the housing is further configured to support the heat exchanger, the pump, and the coolant line within the housing.

In one example, the thermal management device is configured to be fluidly connected, via the coolant line, to a condenser of the ice machine in a closed coolant loop.

In one example, the thermal management device further includes a reservoir fluidly connected to the heat exchanger and the pump via the coolant line. The coolant is addable to the closed coolant loop via the reservoir In one example, the pressure sensor is a pressure switch. The pressure switch is configured to decrease a speed of the pump, the fan, or the pump and the fan when the determined pressure of the coolant in the coolant line is greater than a predetermined threshold pressure.

In one example, the pump is a variable speed pump, the fan is a variable speed fan, or a combination thereof.

In one example, the pressure switch is configured to turn off the pump, the fan, or the pump and the fan when the determined pressure of the coolant in the coolant line is greater than the predetermined threshold pressure.

In one example, the thermal management device further includes a controller in communication with the pressure sensor and the pump, the fan, or the pump and the fan. The pressure sensor is a pressure transducer. The controller is configured to generate a pulse width modulation (PWM) control signal for the pump or the fan, compare the determined pressure to a setpoint threshold, and adjust the PWM control signal based on the comparison.

In one example, a remotely cooled ice machine includes a refrigerant line through which a refrigerant is configured to flow, a compressor configured to compress the refrigerant and circulate the refrigerant through the refrigerant line in a closed refrigerant loop, and a condenser configured to condense the compressed refrigerant. The remotely cooled ice machine also includes a thermal management device that is remote from the ice maker. The thermal management device includes a coolant line through which a coolant is configured to flow. The coolant is different than the refrigerant. The thermal management device also includes a pump configured to circulate the coolant through the coolant line in a closed coolant loop, a fan configured to move air through the thermal management device, and a heat exchanger configured to transfer heat from the coolant to the air moved through the thermal management device. The coolant line fluidly connects the pump and the heat exchanger of the thermal management device and the condenser of the ice maker in the closed coolant loop.

In one example, the ice maker further includes an expansion valve configured to reduce a pressure of the condensed refrigerant, such that the condensed refrigerant is cooled, and an evaporator configured to freeze water and make ice using the cooled refrigerant. The refrigerant line fluidly connects the compressor, the condenser, the expansion valve, and the evaporator in the closed refrigerant loop.

In one example, a first portion of the coolant line fluidly connects an outlet of the thermal management device to a first inlet of the condenser, and a second portion of the coolant line fluidly connects a first outlet of the condenser to an inlet of the thermal management device. A first portion of the refrigerant line fluidly connects the compressor to a second inlet of the condenser, and a second portion of the refrigerant line fluidly connects a second outlet of the condenser to the expansion valve. The ice maker further includes a regulator in line with the first portion of the coolant line or the second portion of the coolant line, and a pressure sensor configured to determine a pressure of the refrigerant within the first portion of the refrigerant line. The regulator is configured to control a flow of the coolant through the coolant line based on the determined pressure of the refrigerant within the first portion of the refrigerant line.

In one example, the regulator is a first regulator. The thermal management device further includes a second regulator in line with the coolant line, downstream of the pump. The second regulator is configured to control the flow of the coolant through the first portion of the coolant line based on an operating pressure window of the first regulator.

In one example, the heat exchanger of the thermal management device is a first heat exchanger. The condenser of the ice maker includes a second heat exchanger. The second heat exchanger is configured to transfer heat from the compressed refrigerant in the refrigerant line to the coolant in the coolant line.

In one example, the thermal management device is a dry cooler fluidly coupled to the ice maker via the coolant line and the condenser.

In one example, the coolant is a mixture of water and Glycol.

In one example, the thermal management device further includes a pressure switch in communication with the pump, the fan, or the pump and the fan of the thermal management device. The pressure switch is configured to determine a pressure of the coolant in the coolant line, at an inlet of the heat exchanger of the thermal management device. The pressure switch is configured to turn off the pump, the fan, or the pump and the fan when the determined pressure of the coolant in the coolant line is greater than a predetermined threshold pressure, such that heat transfer between the air moved through the thermal management device and the coolant in the coolant line is controllable without a direct electrical connection from the thermal management device to the ice maker.

In one example, the thermal management device further includes a reservoir fluidly connected to the heat exchanger and the pump via the coolant line. The coolant is addable to the closed coolant loop via the reservoir.

In one example, a dry cooler includes a housing, a coolant line having an inlet and an outlet, and a heat exchanger in line with the coolant line. The dry cooler also includes a fan supported by the housing. The fan is configured to move air through the housing. The dry cooler also includes a pump supported by the housing and configured to move water or a water mixture through the heat exchanger, via the coolant line. The heat exchanger is configured to transfer heat from the water or the water mixture to the air moved through the housing by the fan. The heat exchanger is configured to be fluidly connected to a condenser of an ice maker in a closed coolant loop including the coolant line, via the inlet and the outlet of the coolant line.

DETAILED DESCRIPTION OF THE DRAWINGS

Figure 1:
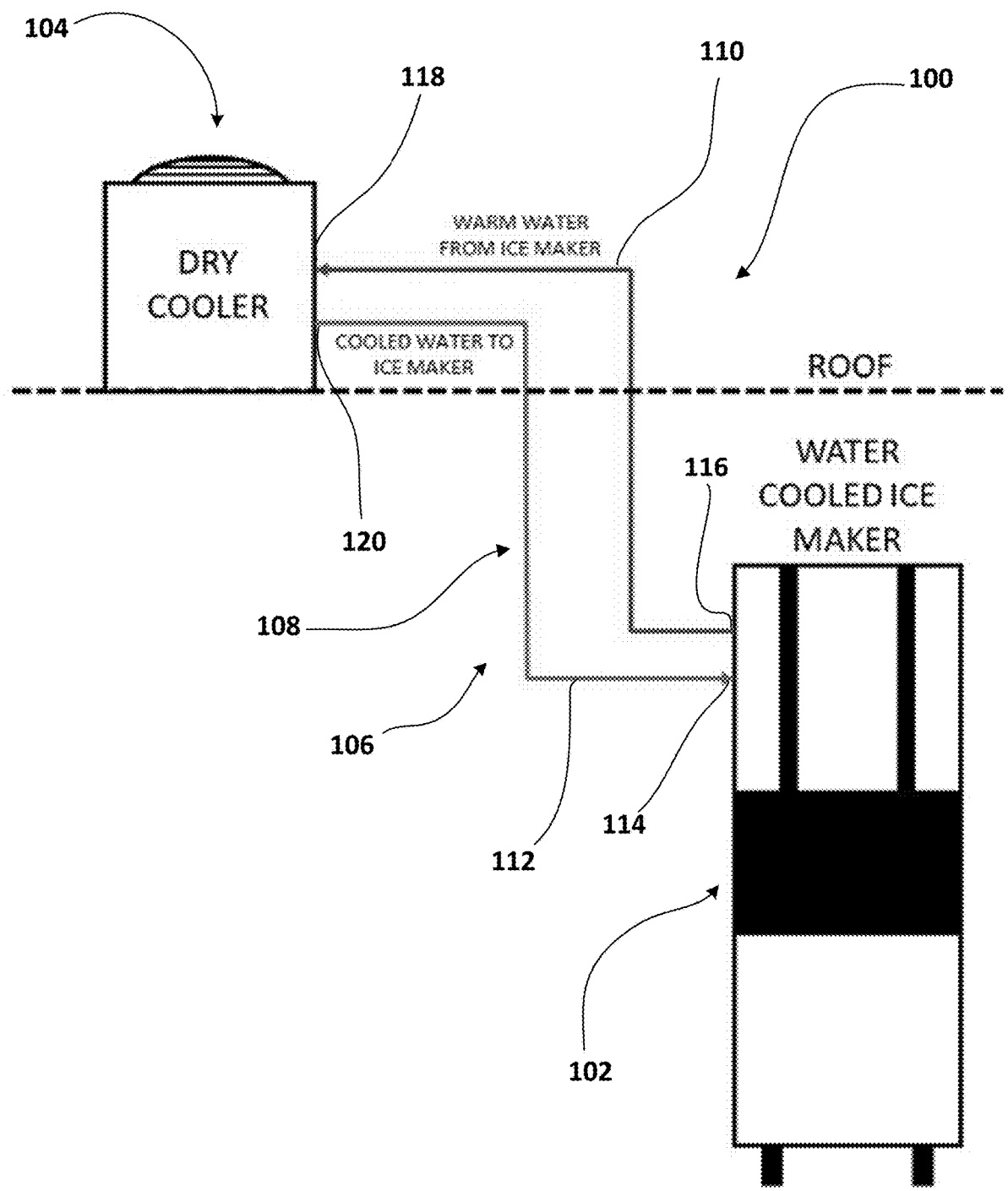
FIG. 1 shows one embodiment of a remotely cooled ice machine.

A state of the art remotely cooled ice machine may include an air cooled condenser (e.g., outside on a roof) to reject heat to the environment, rather than inside a building, thereby lowering heating, ventilation, and air conditioning (HVAC) costs. The state of the art remotely cooled ice machine may use pounds of refrigerant to operate.

With the phase down of common refrigerants such as, for example, HFC refrigerants, new alternative refrigerants have been introduced. Many of these new alternative refrigerants are, however, mildly flammable (e.g., A2 and A2L) or highly flammable (e.g., A3) and have charge limits that prevent use in a remotely cooled ice maker.

Water is not often used as a coolant for a remotely cooled ice machine due to water use associated with a water cooled condenser. This may be addressed, however, by employing a system that circulates outlet water from the water cooled condenser to a chiller to bring a temperature of the outlet water back down. This may, however, be costly and energy inefficient due to the use of two separate refrigeration systems.

The present embodiments provide a remotely cooled ice machine that includes a dry cooler that is remote relative to an ice maker. For example, the dry cooler may be located outside of a building (e.g., on a roof of the building), and the ice maker may be located within the building.

The dry cooler may include a water to air heat exchanger, a fan, a water pump, and a reservoir. The dry cooler does not include its own refrigeration system. Running water or a water mixture (e.g., a water Glycol mixture) through the heat exchanger of the dry cooler via the water pump brings a temperature of the water, for example, down to an ambient temperature of air surrounding the dry cooler, which is moved through the dry cooler by the fan, rather than a preset temperature.

The dry cooler may include a pressure switch to maintain water pressure in the dry cooler (e.g., within a closed water loop fluidly connecting one or more components of the dry cooler with a condenser of the ice maker). The pressure switch may be in communication with the pump and/or the fan. The pressure switch may determine a pressure of the water, for example, flowing through the closed water loop, and may turn off the pump and/or the fan when the determined pressure exceeds a given setpoint (e.g., a predetermined threshold pressure). This allows the dry cooler to shut off when not in use, without needing a direct electrical connection to the ice maker.

In one embodiment, the pump and/or the fan may be variable speed, and the pressure switch may switch between preset speeds of the pump and/or the fan, respectively. In another embodiment, the dry cooler includes a pressure transducer instead of a pressure switch, and a controller is in communication with the pressure transducer. The pressure transducer may determine a pressure of the water, for example, flowing through the closed water loop, and the controller may pulse width modulation (PWM) control the pump and/or the fan based on the pressure determined by the pressure transducer.

The dry cooler may include additional components. For example, the dry cooler may include a valve configured to bypass the pump via a bypass line, and allow the dry cooler to run continuously without over pressurizing the closed water loop.

As another example, the dry cooler may include a water pressure regulator. Due to the dry cooler being remote relative to the ice maker (e.g., on the roof of the building in which the ice maker is located), a size of the pump needed to move the water, for example, through the closed water loop may generate too much water pressure for a pressure regulator of the ice maker (e.g., a refrigerant pressure regulator) to handle. The water pressure regulator may be positioned downstream of an outlet of the pump, and may be configured to hold the pressure of the water, for example, within an operating window of the refrigerant pressure regulator of the ice maker.

The ice maker includes a water to refrigerant condenser (e.g., a condenser) that is part of the both the closed water loop, which fluidly connects the one or more components of the dry cooler and the condenser of the ice maker, and a closed refrigerant loop of the ice maker. The condenser pulls heat out of high pressure gas refrigerant entering the condenser via the closed refrigerant loop of the ice maker, such that the gas is converted to a high pressure liquid refrigerant.

The ice maker may include a water regulator on a water condenser coil of the condenser. The water condenser coil is part of the closed water loop, and the pump of the dry cooler moves the water of the closed water loop through the water condenser coil of the condenser. The water regulator on the water condenser coil is configured to control the flow of the water through the closed water loop based on pressure or temperature. For example, the water regulator on the water condenser coil allows more flow when a temperature or a pressure of the refrigerant entering a refrigerant condenser coil of the condenser exceeds a predetermined setpoint, and allows less flow when the temperature or the pressure of the refrigerant entering the refrigerant condenser coil of the coil is less than the predetermined setpoint or another predetermined setpoint.

In one embodiment, the water regulator is a refrigerant pressure driven water regulator. The refrigerant pressure drive water regulator may be configured to control the flow of the water flowing through the closed water loop, such that a specified refrigerant high side system pressure is maintained.

The closed refrigerant loop of the ice maker fluidly connects the condenser of the ice maker (e.g., the refrigerant condenser coil of the condenser) to a number of other components of the ice maker. For example, the ice maker also includes a compressor, an expansion valve, and an evaporator fluidly connected to the condenser via the closed refrigerant loop.

The compressor is configured to compress and circulate the refrigerant flowing through the closed refrigerant loop. The compressor is positioned upstream relative to the condenser, such that the high pressure gas refrigerant output by the compressor enters the condenser for cooling and condensing.

The expansion valve is configured to convert the high pressure liquid refrigerant exiting the condenser into low pressure liquid and gas refrigerant to cool the evaporator. The expansion valve is positioned downstream relative to the condenser, such that the high pressure liquid refrigerant output by the condenser enters the expansion valve for pressure reduction and further cooling.

The evaporator is configured to absorb heat from liquid water passing over an outer surface of the evaporator, for example, and freeze the liquid water into ice. The evaporator is positioned downstream relative to the expansion valve, such that the low pressure liquid and gas refrigerant output by the expansion valve enters the evaporator for ice making.

The ice maker may include additional components. For example, the ice maker may include a hot gas bypass valve positioned at an outlet of the compressor. The hot gas bypass valve may be configured to send hot refrigerant directly to the evaporator to aid in defrost and/or harvest of ice on the evaporator.

The remotely cooled ice machine (e.g., remotely and water cooled ice machine) of the present embodiments avoids the use of the new alternative refrigerants, and thus, the problems associated with the new alternative refrigerants (e.g., A2, A2L, or A3) such as, for example, flammability and charge limits. The closed water loop allows the water moving through the dry cooler to be perpetually reused, minimizing water usage for the remotely and water cooled ice machine. The use of a pressure sensor within the dry cooler to maintain water pressure in the closed water loop allows the dry cooler to shut off when not in use, without a direct electrical connection to the ice maker. The resultant modularity of the dry cooler simplifies the remotely cooled ice machine, with fewer necessary connections between the ice maker within the building and the dry cooler outside of the building.

FIG. 1 shows one embodiment of a remotely cooled ice machine 100. The remotely cooled ice machine 100 includes an ice maker 102 and a thermal management device 104 that is remote relative to the ice maker 102. The ice maker 102 is, for example, a water cooled ice maker, and the thermal management device 104 is a dry cooler. The water cooled ice maker 102, for example, may be any number of sizes and may generate ice at any number of production rates.

The dry cooler 104, for example, may be remote relative to the water cooled ice maker 102 to move some of the heat and noise generated by components of the ice machine 100 outside. For example, as shown in FIG. 1, the water cooled ice maker 102 may be positioned within a building (e.g., within a restaurant or an office space), and the dry cooler 104 may be positioned on a roof of the building. The ice maker 102 and/or the dry cooler 104 may be positioned in other places within or outside of the building, respectively. For example, the dry cooler 104 may be positioned within the building but in a different room than the ice maker 102.

The dry cooler 104 and the ice maker 102 are fluidly connected in a closed loop 106 (e.g., a closed coolant loop or a closed water loop). The closed water loop 106, for example, includes a refrigerant or coolant line 108 (e.g., a coolant line) through which a coolant flows. The coolant may, for example, be water. In one embodiment, the coolant is a water and glycol mixture. Other coolants or refrigerants may be used.

The coolant line 108 has, for example, a first part 110 and a second part 112. The first part 110 and the second part 112 of the coolant line 108 may be rigid or flexible, and may be made of any number of materials. For example, the first part 110 and the second part 112 of the coolant line 108 may be piping made of copper or plastic, though other materials may be used. The first part 110 and the second part 112 of the coolant line 108 may be made of a same material or may be made of different materials, respectively.

The water cooled ice maker 102 has an inlet 114 and an outlet 116, and the dry cooler 104 has an inlet 118 and an outlet 120. The first part 110 of the coolant line 108 fluidly connects the outlet 116 of the water cooled ice maker 102 to the inlet 118 of the dry cooler 104, and the second part 112 of the coolant line 108 fluidly connects the outlet 120 of the dry cooler 104 to the inlet 114 of the water cooled ice maker 102.

As shown in FIG. 1, cooled water (e.g., a cooled water and glycol mixture) flows from the dry cooler 104 to the water cooled ice maker 102, via the outlet 120 of the dry cooler 104, the second part 112 of the coolant line 108, and the inlet 114 of the water cooled ice maker 102. After cooling a refrigerant that is also flowing through the water cooled ice maker 102 (e.g., within a closed refrigerant loop), the water flowing through the water cooled ice maker 102 exits the water cooled ice maker 102 at the outlet 116 of the water cooled ice maker 102 and flows to the dry cooler 104 via the first part 110 of the coolant line 108 and the inlet 118 of the dry cooler 104.

The dry cooler 104 may include any number of components. For example, referring to FIGS. 2 and 3, the dry cooler 104 may include a heat exchanger 200, a reservoir 202, a pump 204, and a fan 206. The dry cooler 104 may include more, fewer, and/or different components. For example, the dry cooler 104 may include one or more sensors (e.g., a pressure switch; see FIG. 5).

The dry cooler 104 may include a housing 208 that is supported by, for example, the roof of the building, and the housing 208 may support one or more of the components of the dry cooler 104. For example, the housing 208 may support the heat exchanger 200, the reservoir 202, the pump 204, and the fan 206. In one embodiment, the housing 208 supports less than all components of the heat exchanger 200, the reservoir 202, the pump 204, and the fan 206. For example, the heat exchanger 200, the reservoir 202, the pump, the fan 206, or any combination thereof may be supported by the roof of the building, outside of the housing 208 of the dry cooler 104.

The housing 208 of the dry cooler 104 may be any number of shapes and sizes, and may be made of any number of materials. For example, the size of the housing 208 of the dry cooler 104 may be smaller than a size of the water cooled ice maker 102. The size of the housing 208 may be based on, for example, a size of the heat exchanger 200, which may be sized according to heat transfer to be provided by the heat exchanger 200.

The housing 208 of the dry cooler 104 may be made of any number of different materials. For example, the housing 208 of the dry cooler 104 may be made of a metal (e.g., aluminum) or a plastic.

The heat exchanger 200, the reservoir 202, and the pump 204 may be part of the closed water loop 106. For example, the coolant line 108 may also include a third part 210, a fourth part 212, a fifth part 214, and a sixth part 216. The third part 210 of the coolant line 108 fluidly connects the inlet 118 of the dry cooler 104 to an inlet of the heat exchanger 200. The fourth part 212 of the coolant line 108 fluidly connects an outlet of the heat exchanger 200 to an inlet of the reservoir 202. The fifth part 214 of the coolant line 108 fluidly connects an outlet of the reservoir 202 to an inlet of the pump 204. The sixth part 216 of the coolant line 108 fluidly connects an outlet of the pump 204 to the outlet 120 of the dry cooler 104.

Figure 2:
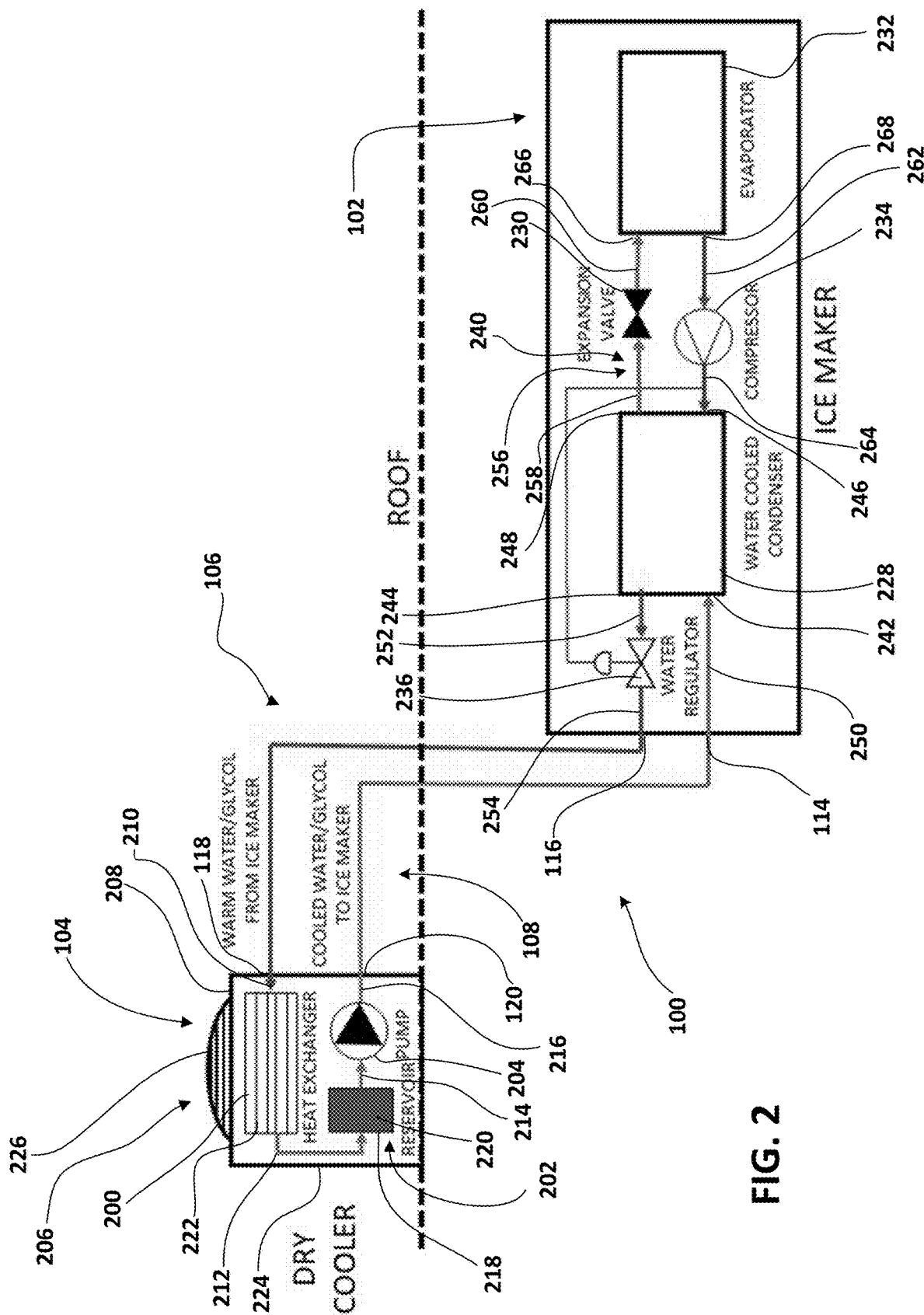
FIG. 2 shows another embodiment of a remotely cooled ice machine.
Figure 3:
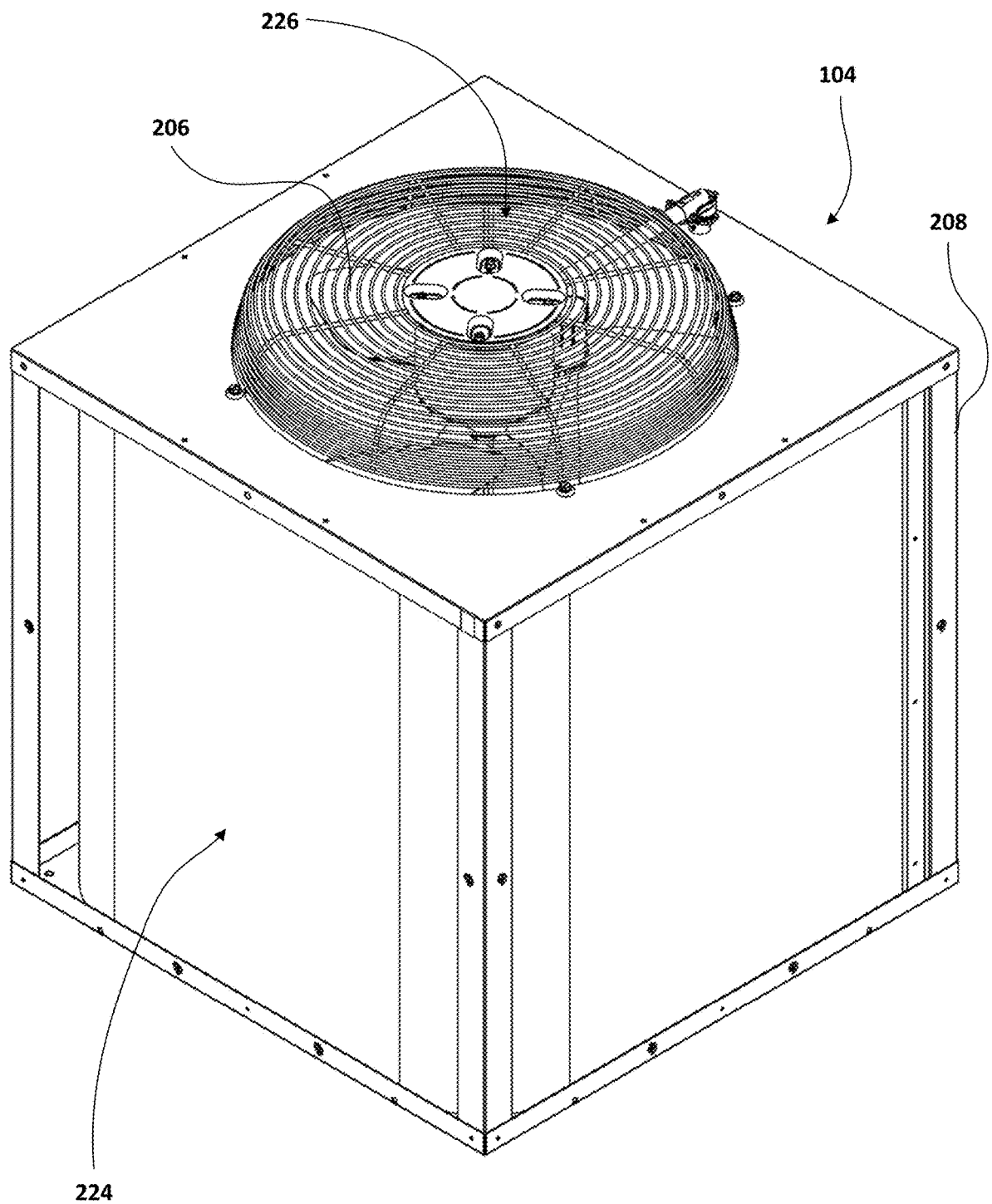
FIG. 3 shows one embodiment of a dry cooler of the remotely cooled ice machine of FIG. 2.

In the example shown in FIGS. 2 and 3, the third part 210, the fourth part 212, the fifth part 214, and the sixth part 216 of the coolant line 108 are supported by the housing 208 of the dry cooler 104, within the housing 208 of the dry cooler 104. The coolant line 108 may include more, fewer, and/or different parts. For example, at least a portion of the fourth part 212, the fifth part 214, and/or the sixth part 216 of the coolant line 108 may be disposed outside of the housing 208 of the dry cooler 104.

The third part 210, the fourth part 212, the fifth part 214, and/or the sixth part 216 of the coolant line 108 may be a same size (e.g., have a same diameter) or one or more different sizes than the first part 110 and/or the second part 112 of the coolant line 108. The third part 210, the fourth part 212, the fifth part 214, and/or the sixth part 216 of the coolant line 108 may be made of a same material or one or more different materials than the first part 110 and/or the second part 112 of the coolant line 108. For example, the first part 110 and the second part 112 of the coolant line 108 may be made of a metal (e.g., copper), and the third part 210, the fourth part 212, the fifth part 214, and the sixth part 216 of the coolant line 108 may be made of a plastic.

The pump 204 is configured to move water or a water mixture (e.g., the water and Glycol mixture) through the dry cooler 104. For example, with reference to the example shown in FIG. 2, the pump 204 is configured to move water or the water mixture through the dry cooler 104 via the third part 210 of the coolant line 108, the heat exchanger 200, the fourth part 212 of the coolant line 108, the reservoir 202, the fifth part 214 of the coolant line 108, the pump 204, and the sixth part 216 of the coolant line 108. In other embodiments, the pump 204 may move water or the water mixture through the dry cooler 104 via more, fewer, and/or different components and/or parts of the coolant line 108.

The pump 204 may be any number of different types of pumps. For example, the pump 204 may be a centrifugal pump, a positive-displacement pump, or an axial-flow pump. The pump 204 may be a fixed speed pump or a variable speed pump. The pump 204 may be any number of sizes. For example, the pump 204 may be sized based on a distance between the water cooled ice maker 102 and the dry cooler 104 (e.g., a sum of a length of the first part 110 of the coolant line 108 and a length of the second part 112 of the coolant line 108) and/or an amount of heat transfer to be provided (e.g., by the heat exchanger 200 and/or a heat exchanger of the water cooled ice maker 102).

The reservoir 202 may include a housing 218 configured to store additional refrigerant 220 for the coolant line 108. For example, the housing 218 of the reservoir 202 may store reserve water or reserve Glycol and water mixture, for example, for the closed water loop 106. In one embodiment, the reservoir 202 includes a port via which refrigerant may be added or removed. For example, the water mixture may be added to the closed water loop 106 via the port of the reservoir 202. In one embodiment, due to use of the closed water loop 106, additional Glycol and/or water may not need to be added for an extended period of time (e.g., a week, a month, or a year) via the reservoir 202, as the water mixture, for example, circulates via the closed water loop 106 and is not dumped.

The heat exchanger 200 may be any number of different types of heat exchangers. For example, the heat exchanger 200 may be a water to air heat exchanger that includes, for example, a finned-tube coil through which the water mixture, for example, flows. Such a heat exchanger 200 includes one or more (e.g., a plurality of) fins 222 to increase convective heat transfer from the water mixture flowing through the heat exchanger 200 to surrounding air. Other types of heat exchangers may be provided.

The fan 206 may be any number of different types of fans. For example, the fan 206 may be a centrifugal fan, a cross flow fan, or an axial fan. The fan 206 may be a fixed speed fan or a variable speed fan. In one embodiment, the fan 206 is configured to pull air (e.g., outside air) into the housing 208 of the dry cooler 104 via an air intake 224 of the dry cooler 104 (e.g., within the housing 208 of the dry cooler 104), move the air around and/or through the heat exchanger 200 (e.g., the finned-tube coil of the heat exchanger 200), and push the air out of an air exhaust 226 of the dry cooler 104 (e.g., within the housing 208 of the dry cooler 104). In another embodiment, the fan 206 is configured to push air (e.g., outside air) into the housing 208 of the dry cooler 104 via the air intake 224 of the dry cooler, push the air around and/or through the heat exchanger 200, and push the air out of the air exhaust 226 of the dry cooler 104.

The air (e.g., outside air) moving through the housing 208 of the dry cooler 104 and around and/or through the heat exchanger 200 cools the water mixture, for example, running through the closed water loop 106 at the heat exchanger 200. Heat transfer (e.g., conduction, convection, and radiation) from the water mixture, for example, running through the heat exchanger 200 depends on an ambient temperature of the air moving through the housing 208 of the dry cooler 104. The heat transfer brings a temperature of the water mixture down towards the ambient temperature of the air moving through the housing 208 of the dry cooler 104 (e.g., instead of a preset temperature).

The water cooled ice maker 102 may include any number of components. For example, referring to FIG. 2, the water cooled ice maker 102 may include a condenser 228 (e.g., a water cooled condenser), an expansion valve 230, an evaporator 232, and a compressor 234. The water cooled ice maker 102 may include more, fewer, and/or different components. For example, the water cooled ice maker 102 may include a water regulator 236 between the water cooled condenser 228 and the outlet 116 of the water cooled ice maker 102.

Figure 4:
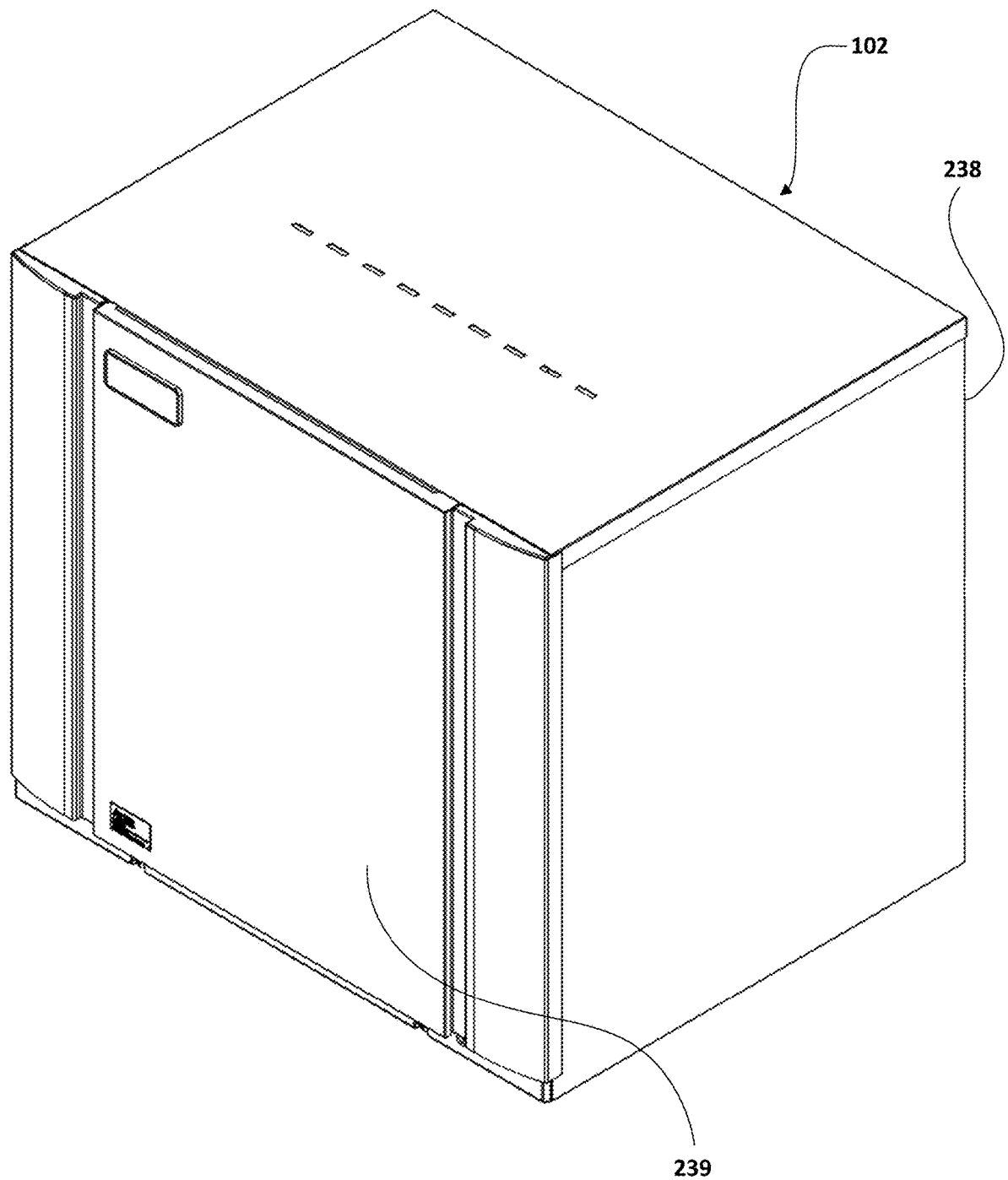
FIG. 4 shows one embodiment of a water cooled ice maker of the remotely cooled ice machine of FIG. 2.

Referring to FIGS. 2 and 4, the water cooled ice maker 102 may include a housing 238 that is, for example, supported within the building (e.g., by a floor within a room of the building). In one embodiment, the water cooled ice maker 102 is disposed outside of the building, and the housing 238 of the water cooled ice maker 102 is supported by the ground.

The housing 238 of the water cooled ice maker 102 may support one or more of the components of the water cooled ice maker 102. For example, the housing 238 may support the water cooled condenser 228, the expansion valve 230, the evaporator 232, the compressor 234, and the water regulator 236 of the water cooled ice maker 102. In one embodiment, the housing 238 of the water cooled ice maker 102 supports less than all of the water cooled condenser 228, the expansion valve 230, the evaporator 232, the compressor 234, and the water regulator 236. For example, the water cooled condenser 228, the expansion valve 230, the evaporator 232, the compressor 234, the water regulator 236, or any combination thereof may be disposed outside of the housing 238 of the water cooled ice maker 102.

The housing 238 of the water cooled ice maker 102 may be any number of shapes and sizes, and may be made of any number of materials. For example, the size of the housing 238 of the water cooled ice maker 102 may be larger than the size of the housing 208 of the dry cooler 104. The size of the housing 238 may be based on, for example, a volume of ice that may be stored within the water cooled ice maker 102. The housing 238 may include one or more doors 239 (e.g., a door) via which a bin that stores ice made by the evaporator 232 is accessible.

The housing 238 of the water cooled ice maker 102 may be made of any number of different materials. For example, the housing 238 of the water cooled ice maker 102 may be made of one or more metals (e.g., aluminum) and/or one or more plastics.

The water cooled condenser 228 may be part of both the closed water loop 106 and a closed refrigerant loop 240. The water cooled condenser 228 includes a first inlet 242, a first outlet 244, a second inlet 246, and a second outlet 248. The coolant line 108 may further include a seventh part 250, an eighth part 252, and a ninth part 254. The seventh part 250 of the coolant line 108 fluidly connects the inlet 114 of the water cooled ice maker 102 to the first inlet 242 of the water cooled condenser 228. The eighth part 252 of the coolant line 108 fluidly connects the first outlet 244 of the water cooled condenser 228 to an inlet of the water regulator 236. The ninth part 254 of the coolant line 108 fluidly connects an outlet of the water regulator 236 to the outlet 116 of the water cooled ice maker 102.

In the example shown in FIG. 2, the seventh part 250, the eighth part 252, and the ninth part 254 of the coolant line 108 are supported by the housing 238 of the water cooled ice maker 102, within the housing 238 of the water cooled ice maker 102. The coolant line 108 may include more, fewer, and/or different parts. For example, the water regulator 236 may be disposed outside of the housing 238 of the water cooled ice maker 102; thus, the coolant line 108 may not include the ninth part 254 (e.g., the first part 110 of the coolant line 108 fluidly connects the outlet of the water regulator 236 to the inlet 118 of the dry cooler 104), and a portion of the eighth part 252 of the coolant line 108 may be disposed outside of the housing 238 of the water cooled ice maker 102.

The seventh part 250, the eighth part 252, and/or the ninth part 254 of the coolant line 108 may be a same size (e.g., have a same diameter) or one or more different sizes than the first part 110, the second part 112, the third part 210, the fourth part 212, the fifth part 214, and/or the sixth part 216 of the coolant line 108. The seventh part 250, the eighth part 252, and/or the ninth part 254 of the coolant line 108 may be made of a same material or one or more different materials than the first part 110, the second part 112, the third part 210, the fourth part 212, the fifth part 214, and/or the sixth part 216 of the coolant line 108. For example, the seventh part 250, the eighth part 252, and/or the ninth part 254 of the coolant line 108 may be made of a plastic.

The water cooled condenser 228 may also be part of the closed refrigerant loop 240 with at least the expansion valve 230, the evaporator 232, and the compressor 234. For example, the water cooled condenser 228, the expansion valve 230, the evaporator 232, and the compressor 234 are fluidly connected to each other with a refrigerant line 256 in the closed refrigerant loop 240.

The refrigerant line 256 may include a first part 258, a second part 260, a third part 262, and a fourth part 264. The second outlet 248 of the water cooled condenser 228 may be fluidly connected to an inlet of the expansion valve 230 via the first part 258 of the refrigerant line 256. An outlet of the expansion valve 230 may be fluidly connected to an inlet 266 of the evaporator 232 via the second part 260 of the refrigerant line 256. An outlet 268 of the evaporator 232 may be fluidly connected to an inlet of the compressor 234 via the third part 262 of the refrigerant line 256. An outlet of the compressor 234 may be fluidly connected to the second inlet 246 of the water cooled condenser 228 via the fourth part 264 of the refrigerant line 256.

The first part 258, the second part 260, the third part 262, and/or the fourth part 264 of the refrigerant line 256 may be a same size (e.g., have a same diameter) or one or more different sizes than the seventh part 250, the eighth part 252, and/or the ninth part 254 of the coolant line 108. The first part 258, the second part 260, the third part 262, and/or the fourth part 264 of the refrigerant line 256 may be made of a same material or one or more different materials than the seventh part 250, the eighth part 252, and/or the ninth part 254 of the coolant line 108. For example, the first part 258, the second part 260, the third part 262, and/or the fourth part 264 of the refrigerant line 256 may be made of a metal (e.g., copper), and the seventh part 250, the eighth part 252, and/or the ninth part 254 of the coolant line 108 may be made of a plastic.

The compressor 234 is configured to compress and move refrigerant through the water cooled ice maker 102 via the refrigerant line 256 of the closed refrigerant loop 240 (e.g., circulate the refrigerant around the closed refrigerant loop 240). For example, with reference to the example shown in FIG. 2, the compressor 234 is configured to move refrigerant through the water cooled ice maker 102 in the closed refrigerant loop 240, via the fourth part 264 of the refrigerant line 256, the water cooled condenser 228, the first part 258 of the refrigerant line 256, the expansion valve 230, the second part 260 of the refrigerant line 256, the evaporator 232, and the third part 262 of the refrigerant line 256. In other embodiments, the compressor 234 may move refrigerant through the water cooled ice 102 maker via more, fewer, and/or different components and/or parts of the refrigerant line 256.

The compressor 234 may move any number of different types of refrigerants through the refrigerant line 256 of the closed refrigerant loop 240. For example, the compressor 234 may move R134A, R404A, R410A, R507, or another refrigerant through the refrigerant line 256 of the closed refrigerant loop 240.

The compressor 234 may be any number of different types of compressors. For example, the compressor 234 may be a centrifugal compressor, a rotary compressor, a reciprocating compressor, a screw compressor, a scroll compressor, or another type of compressor. The compressor 234 may be a fixed speed compressor or a variable speed compressor. The compressor 234 may be any number of sizes. For example, the compressor 234 may be sized based on a size of the water cooled ice maker 102 and/or a production rate of the water cooled ice maker 102.

The refrigerant moving through the closed refrigerant loop 240 is a high pressure gas refrigerant at the outlet of the compressor 234, through the fourth part 264 of the refrigerant line 256, and at the second inlet 246 of the water cooled condenser 228. The water cooled condenser 228 is configured to pull heat out of the high pressure gas refrigerant from the compressor 234 with the water mixture, for example, also running through the water cooled condenser 228 (e.g., via the closed water loop 106). When the water cooled condenser 228 pulls heat out of the high pressure gas refrigerant from the compressor 234, the refrigerant is converted into a high pressure liquid refrigerant.

The refrigerant is a high pressure liquid refrigerant at the second outlet 248 of the water cooled condenser 228, through the first part 258 of the refrigerant line 256, and at the inlet of the expansion valve 230. The expansion valve 230 is configured to convert the high pressure liquid refrigerant into, for example, a low pressure liquid and gas refrigerant used to cool the evaporator 232. The expansion valve 230 is configured to restrict flow of the refrigerant, reducing a pressure of the refrigerant entering at the inlet of the expansion valve 230, and thus, based on the pressure and temperature relationship, also reducing a temperature of the refrigerant.

The expansion valve 230 may be any number of different types of expansion valves. For example, the expansion valve 230 may be a thermostatic expansion valve (e.g., externally equalized or internally equalized), an automatic or constant-pressure expansion valve, or another type of expansion valve. The expansion valve 230 may be any number of sizes. For example, the expansion valve 230 may be sized based on a capacity (e.g., a BTU capacity) of the evaporator 232 and/or the compressor 234.

The refrigerant is, for example, a low pressure liquid and gas refrigerant at an outlet of the expansion valve 230, through the second part 260 of the refrigerant line 256, and at the inlet 266 of the evaporator 232. The evaporator 232 is configured to pull heat out of liquid water in thermal communication with (e.g., running over) the evaporator 232, and freeze the liquid water into ice.

The evaporator 232 may be any number of different types of evaporators. For example, the evaporator 232 may be a plate evaporator (e.g., a grid cell plate or a flat surface plate evaporator), a barrel evaporator, or another type of evaporator. The evaporator 232 may produce any number of different types of ice. For example, the evaporator 232 may produce cubes, nuggets, flakes, and/or other types of ice. The evaporator 232 may be any number of sizes. For example, the evaporator 232 may be sized based on a size of the water cooled ice maker 102 and/or a production rate of the water cooled ice maker 102.

The refrigerant of the closed refrigerant loop 240 exiting the evaporator 232 at the outlet 268 of the evaporator 232 may be converted into, for example, low pressure gas refrigerant after pulling heat from the water running over the evaporator 232, for example. The refrigerant may be a low pressure gas refrigerant at the outlet 268 of the evaporator 232, through the third part 262 of the refrigerant line 256, and at the inlet of the compressor 234.

As discussed above, the dry cooler 104 may not include a refrigeration system. Running the water mixture, for example, through the heat exchanger 200 of the dry cooler 104 brings the temperature of the water mixture down towards the ambient temperature of the air surrounding the dry cooler 104, which varies based on a time of day and a time of year. The remotely cooled ice machine 100 may include one or more components to control heat transfer within the remotely cooled ice machine 100.

Figure 5:
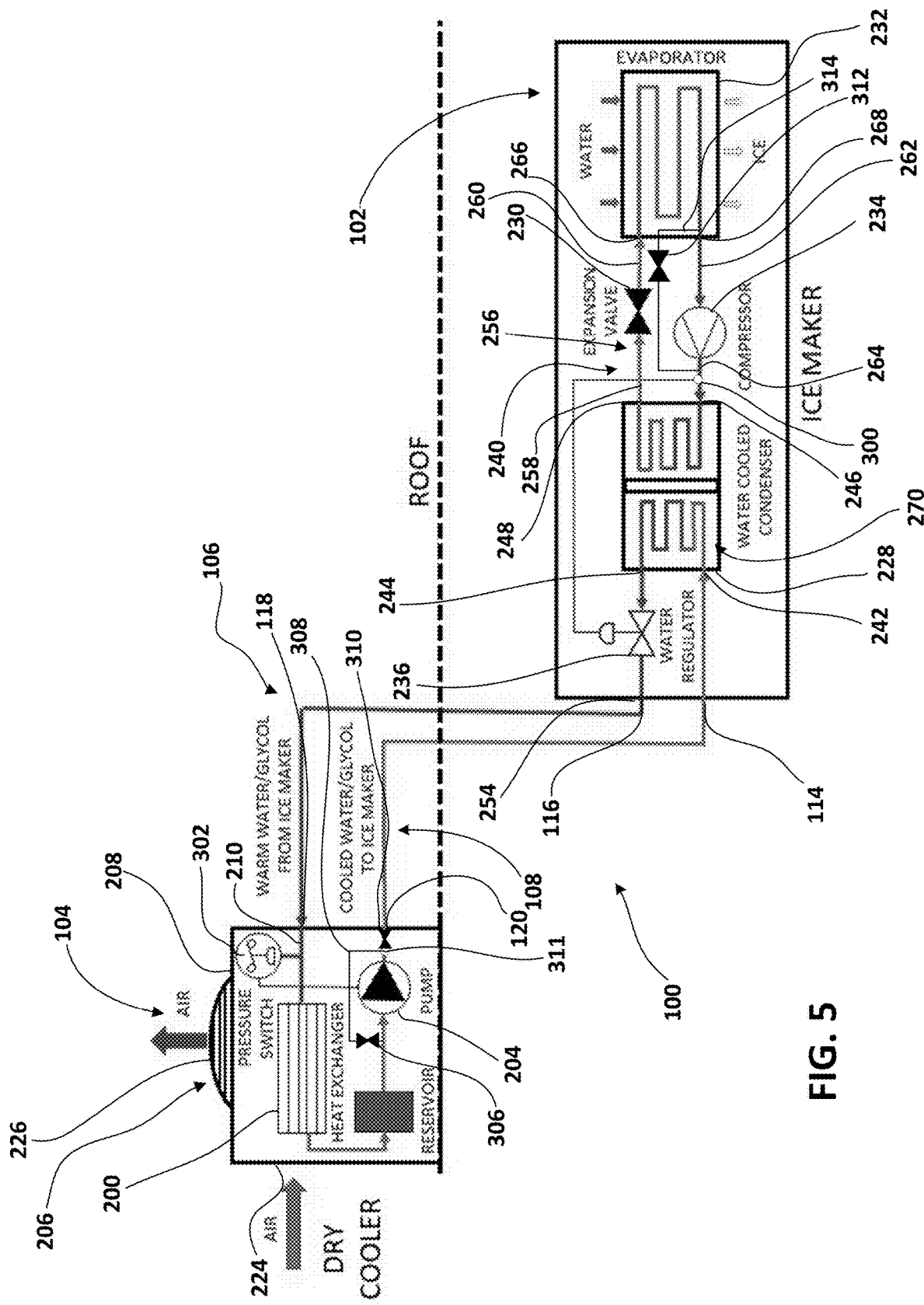
FIG. 5 shows yet another embodiment of a remotely cooled ice machine.

Referring to FIG. 5, heat transfer within the remotely cooled ice machine 100 may be controlled by controlling a flow rate of the water mixture, for example, through the closed water loop 106, a flow rate of the refrigerant through the closed refrigerant loop 240, and/or a flow rate of air through the dry cooler 104.

For example, heat transfer from the warm water mixture entering the dry cooler 104 via the closed water loop 106, for example, to the air moving through the dry cooler may be increased by increasing a flow rate of the air moving through the dry cooler 104 (e.g., by increasing a speed of the fan 206) and may be decreased by decreasing the flow rate of the air moving through the dry cooler 104. As another example, heat transfer from the high pressure gas refrigerant entering the water cooled condenser 228 at the second inlet 246 of the water cooled condenser 228 to the cooled water mixture passing through the water cooled condenser 228 via the closed water loop 106 may be increased by increasing a flow rate of the water mixture, for example, moving through the closed water loop 106 and/or by increasing a flow rate of the refrigerant moving through the closed refrigerant loop 240, and may be decreased by decreasing the flow rate of the water mixture moving through the closed water loop 106 and/or by decreasing the flow rate of the refrigerant moving through the closed refrigerant loop 240.

The water regulator 236, for example, may be configured to control the flow of the water mixture, for example, through the closed water loop 106 based on pressure or temperature. The water regulator 236 may be any number of different types of water regulators including, for example, a back pressure water regulator, a vacuum pressure water regulator, a differential pressure water regulator, a pressure-reducing water regulator, or a different type of water regulator.

At least one sensor 300 may be disposed within the closed refrigerant loop 240. The at least one sensor 300 disposed within the closed refrigerant loop 240 may include at least one pressure sensor configured to determine at least one pressure (e.g., a pressure) and/or at least one temperature sensor configured to determine at least one temperature (e.g., a temperature) of the refrigerant flowing through the closed refrigerant loop 240. For example, a sensor of the at least one sensor 300 may be disposed adjacent to the second inlet 246 of the water cooled condenser 228 (e.g., within the fourth part 264 of the refrigerant line 256, upstream of the second inlet 246 of the water cooled condenser 228) to determine the temperature or the pressure of the refrigerant entering the water cooled condenser 228 at the second inlet 246.

The water regulator 236 may be configured to control the flow of the water mixture, for example, based on the determined pressure or the determined temperature (e.g., a determined parameter). The water regulator 236 may include a processor and/or a memory, or may be in communication with a processor and/or a memory of a first controller (e.g., a first processor and/or a first memory of a controller associated with the water cooled ice maker). The water regulator 236 may be in communication with the first controller wirelessly or via a wired connection.

The first memory, for example, may be configured to store a predetermined setpoint (e.g., a first predetermined setpoint; a temperature setpoint or a pressure setpoint), and the first processor, for example, may be configured to compare the determined parameter to the first predetermined setpoint. When the determined parameter is greater than the first predetermined setpoint, the water regulator 236 is configured (e.g., the processor instructs the water regulator 236) to allow more flow of the water mixture, for example. When the determined parameter is less than the first predetermined setpoint, the water regulator 236 is configured (e.g., the processor instructs the water regulator 236) to allow less flow (e.g., restrict the flow) of the water mixture, for example.

In an embodiment in which the determined parameter is a pressure, the water regulator 236 may be a refrigerant pressure driven water regulator. Such a water regulator 236 may be configured to control the flow of the water mixture through the closed water loop 106 to maintain a specified refrigerant high side system pressure (e.g., within the closed refrigerant loop 240).

The dry cooler 104 may include a pressure sensor 302 (e.g., a first pressure sensor of the dry cooler 104). The pressure sensor 302 may be any number of different types of pressure sensors including, for example, a pressure switch (e.g., a mechanical pressure switch or an electronic pressure switch), a pressure transducer (e.g., a strain gauge pressure transducer, a capacitance pressure transducer, a potentiometric pressure transducer, or a resonant wire pressure transducer), or another type of pressure sensor.

In an embodiment in which the pressure sensor 302 is a pressure switch, the pressure switch 302 may determine a pressure of the water mixture, for example, flowing through the closed water loop 106 within the third part 210 of the coolant line 108, adjacent to the inlet of the heat exchanger 200. The pressure sensor 302 and/or another pressure sensor may determine the pressure of the water mixture, for example, at other locations within the closed water loop 106

The pressure switch 302 may include a processor and/or a memory, may be in communication with the first processor and/or the first memory (e.g., of the controller associated with the water cooled ice maker 102), and/or may be in communication with a second processor and/or a second memory of a second controller (e.g., a controller associated with the dry cooler 104 and separate from the water cooled ice maker 102). The pressure switch 302 may be in communication with the second controller, for example, wirelessly or via a wired connection.

The memory of the pressure switch 302 or the second memory of the second controller, for example, may store a second predetermined setpoint (e.g., a pressure setpoint). The processor of the pressure switch 302 or the second processor of the second controller, for example, may compare the determined pressure of the water mixture, for example, to the second predetermined setpoint. When, based on the comparison of the determined pressure of the water mixture to the second predetermined setpoint, for example, the determined pressure is greater than (e.g., greater than or equal to) the second predetermined setpoint, the pressure switch 302 opens. For example, the processor of the pressure switch 302 or the second processor of the second controller instructs the pressure switch 302 to open. In one embodiment, the pressure switch 302 is a mechanical pressure switch configured to pen without instructions from a processor when the second predetermined setpoint is reached.

The pressure switch 302 may be in communication with (e.g., via a wired connection) the pump 204 and/or the fan 206. The pressure switch 302, when open, may interrupt power (e.g., from a battery or wall power) to the pump 204 and/or the fan 206. In other words, when, based on the comparison of the determined pressure of the water mixture to the second predetermined setpoint, for example, the determined pressure is greater than or equal to the second predetermined setpoint, for example, the pressure switch 302 turns off the pump 204 and/or the fan 206. This allows the dry cooler 104 to shut off when the dry cooler 104 is not in use, without a direct electrical connection to the water cooled ice maker 102.

In one embodiment, there is no direct electrical connection between the dry cooler 104 and the water cooled ice maker 102. In another embodiment, there is a direct electrical connection between the dry cooler 104 and the water cooled ice maker 102, and the dry cooler 104 may be turned off at the water cooled ice maker 102 via this direct electrical connection.

In other embodiments, the pump 204 and/or the fan 206 is variable speed. In such an embodiment, the pressure switch 302 may switch between preset speeds. For example, the pressure switch may switch between two different voltages being applied to the pump 204 or the fan 206 (e.g., via circuitry) based on the comparison of the determined pressure of the water mixture to the second predetermined setpoint. In other words, when, based on the comparison, the determined pressure of the water mixture is less than the second predetermined setpoint, the pressure switch 302 may be in a first position, such that a first voltage of the two voltages is applied to the pump 204 or the fan 206, and the pump 204 or the fan 206 moves (e.g., rotates) at a first speed (e.g., a first rotational speed). When, based on the comparison, the determined pressure of the water mixture is greater than or equal to the second predetermined setpoint, the pressure switch 302 may be in (e.g., moved to) a second position, such that a second voltage of the two voltages is applied to the pump 204 or the fan 206 (e.g., via circuitry), and the pump 204 or the fan 206 moves (e.g., rotates) at a second speed (e.g., a second rotational speed). In one embodiment, the second voltage is less than the first voltage, and thus, the second rotational speed is less than the first rotational speed.

In one embodiment, the pressure sensor 302 is a pressure transducer, and the pressure transducer 302 is in communication with (e.g., electrically connected to) the second controller, for example. The second processor of the second controller, for example, may control power to the pump 204 and/or the fan 206 using pulse width modulation (PWM) based on the pressure determined by the pressure transducer 302 and the second predetermined setpoint, for example. For example, the second processor of the second controller may compare the determined pressure to the second predetermined setpoint, and adjust a PWM control signal based on the comparison.

Other control of the pump 204 and/or the fan 206 may be provided. For example, instead of control of the pump 204 and/or the fan using a pressure sensor, a direct electrical connection between the dry cooler 104 and the ice maker 102 may be provided. Via this direct electrical connection, when the compressor 234 of the ice maker 102 is on, for example, the dry cooler 104 (e.g., the pump 204 and/or the fan 206 of the dry cooler 104) may also be on. Alternatively, a separate relay (e.g., within the ice maker 102) may control the dry cooler 104 (e.g., the pump 204 and/or the fan 206 of the dry cooler 104).

The dry cooler 104 and/or the water cooled ice maker 102 may include more, fewer, and/or different components. For example, the dry cooler 104 may include a valve 306 and a bypass line 308. The second controller, for example, may control the valve 306 (e.g., open the valve 306) to prevent the closed water loop 106 from being over-pressurized. In one embodiment, the second controller does not control the valve 306; instead, the valve 306 controls itself (e.g., as a pressure relief valve).

The valve 306 may be any number of different types of valves. For example, the valve 306 may be a ball valve, a butterfly valve, a diaphragm valve, a gate valve, a pinch valve, a piston valve, a pressure relief valve, or another type of valve. The valve 306 may include a motor, and the second controller, for example, may be configured to control the motor of the valve 306 to open and close the valve 306.

In one embodiment, when the second predetermined setpoint or a third predetermined setpoint (e.g., a pressure setpoint) is reached, instead of the pressure switch 302, for example, turning off the pump 204, for example, the second controller may instruct the valve 306 to open. The open valve 306 (e.g., and closed valve(s) upstream and/or downstream of the pump 204) may cause the water mixture, for example, to flow through the bypass line 308 and around the pump 204. The bypass line 308 thus becomes part of the closed water loop 106 (e.g., instead of the pump 204). This may allow the water mixture, for example, to run continuously through the closed water loop 106 without over pressurizing the closed water loop 106.

As another example, the dry cooler 104 may include a water pressure regulator 310. The water pressure regulator 310 may be any number of different types of water pressure regulators including, for example, a back pressure water regulator, a vacuum pressure water regulator, a differential pressure water regulator, a pressure-reducing water regulator, or a different type of water regulator.

The water pressure regulator 310 may be downstream of the pump 204. For example, the water pressure regulator 310 may be part of the closed water loop 106 and between the pump 204 and the outlet 120 of the dry cooler 104. The pump 204 may be sized such that the water mixture, for example, may flow between the water cooled ice maker 102 located floors below the dry cooler 104, and the dry cooler 104 located on the roof of the building, for example. A pump 204 large enough to circulate the water mixture, for example, through the closed water loop 106 may generate too much water pressure for the water regulator 236 of the water cooled ice maker 102 to handle. The water pressure regulator 310 may thus hold a pressure of the water mixture, for example, exiting the dry cooler 104 within an operating window of the water regulator 236 of the water cooled ice maker 102.

The dry cooler 104 may include another pressure sensor 311 (e.g., a second pressure sensor of the dry cooler 104). The second pressure sensor 311 may be configured to determine (e.g., measure) a pressure of the water mixture, for example, at the outlet of the pump 204. The water pressure regulator 310 may be controlled based on the determined pressure at the outlet of the pump 204. The second controller, for example, may control the water pressure regulator 310 of the dry cooler 104. Alternatively or additionally, the water pressure regulator 310 of the dry cooler 104 may include a processor and/or a memory that may be used to control the water pressure regulator 310 of the dry cooler 104.

The dry cooler 104 may include additional components. For example, the dry cooler 104 may include a junction box for electrical connections (e.g., between a power source such as a battery, the pressure switch 302, and the pump 204 and/or the fan 206). As another example, the dry cooler 104 may include an electrical box for internal wire connections. The dry cooler 104 may include more, fewer, and/or different components.

The water cooled ice maker 102 may include more, fewer, and/or different components. For example, the water cooled ice maker 102 may include a valve 312 (e.g., a hot gas bypass valve) and a bypass line 314 (e.g., a hot gas bypass line). The first controller, for example, may control the valve 312 (e.g., at least partially open the valve 312) to send hot refrigerant exiting the compressor 234 directly to the evaporator 232 to aid in defrosting and/or harvesting ice on the evaporator 232. In one embodiment, the first controller does not control the valve 312; instead, the valve 312 includes a processor configured to instruct the valve 312 to open and close.

The valve 312 may be any number of different types of valves. For example, the valve 312 may be a ball valve, a butterfly valve, a diaphragm valve, a gate valve, a pinch valve, a piston valve, a pressure relief valve, or another type of valve. The valve 312 may include a motor, and the first controller, for example, may be configured to control the motor of the valve 312 to open and close the valve 312. The valve 312 may be activated to aid in the defrosting and/or harvesting of ice on the evaporator 232 based on, for example, the remotely cooled ice machine 100 being in a particular mode, user input at the water cooled ice maker 102, and/or other control.

As another example, the water cooled ice maker 102 may include a heat exchanger between the second outlet 248 of the water cooled condenser 228 and the inlet of the expansion valve 230, and between the outlet 268 of the evaporator 232 and the inlet of the compressor 234. This may increase subcooling to the expansion valve 230 and increase superheating to the compressor 234.

As yet another example, the water cooled ice maker 102 may include a high pressure safety configured to cut power to the compressor 234 to prevent overheating of the refrigerant flowing through the closed refrigerant loop 240 and/or to prevent over pressurization of the refrigerant exiting the compressor 234. The high pressure safety may be, for example, a pressure switch configured to determine a pressure at the outlet of the compressor 234 (e.g., within the fourth part 264 of the refrigerant line 256) and cut power (e.g., from a battery or wall power) to the compressor 234 when the pressure at the outlet of the compressor 234 reaches a fourth predetermined setpoint (e.g., a pressure setpoint).

As another example, the water cooled ice maker 102 may include a low pressure safety configured to cut power to the compressor 234 to prevent operation of the water cooled ice maker 102 when an amount of refrigerant flowing through the closed refrigerant loop 240 is low. The low pressure safety may be, for example, a pressure switch electrically connected to the compressor 234. The low pressure safety may be configured to determine a pressure at the outlet of the expansion valve 230 (e.g., within the second part 260 of the refrigerant line 256) or the outlet 268 of the evaporator 232, for example, and cut power (e.g., from a battery or wall power) to the compressor 234 when the determined pressure falls to or is less than a fifth predetermined setpoint (e.g., a minimum pressure setpoint).

The water cooled ice maker 102 may include additional components. For example, the water cooled ice maker 102 may include a high temperature safety (e.g., a temperature switch) within the refrigerant line 256 (e.g., the fourth part 264 of the refrigerant line 256). The high temperature safety may be electrically connected to the compressor 234, and may interrupt power to the compressor 234 when a sixth predetermined setpoint (e.g., a temperature setpoint) is met or exceeded. As another example, the water cooled ice maker 102 may include a junction box for electrical connections and/or an electrical box for internal wire connections. The water cooled ice maker 102 may include more, fewer, and/or different components.

Referring to FIG. 5, in summary and as an example, air (e.g., ambient air) is pulled into the housing 208 of the dry cooler 104 via the air intake 224 of the dry cooler 104 by the fan 206, pushed and/or pulled around and/or through the heat exchanger 200, and pushed and/or pulled out of the air exhaust 226 of the dry cooler 104. The air moving through the housing 208 of the dry cooler 104 and around and/or through the heat exchanger 200 cools the water mixture, for example, running through the closed water loop 106 at the heat exchanger 200.

The cooled water mixture, for example, exits the dry cooler (e.g., at the outlet 120 of the dry cooler 104) and enters the water cooled ice maker 102 (e.g., at the inlet 114 of the water cooled ice maker 102) via the closed water loop 106. Within the water cooled ice maker 102, the cooled water mixture enters the water cooled condenser 228 (e.g., at the first inlet 242 of the water cooled condenser 228).

The water cooled condenser 228 includes a heat exchanger 270. The heat exchanger 270 may be any number of different types of heat exchanger including, for example, a shell and tube heat exchanger, a shell and coil heat exchanger, a double tube heat exchanger, or another type of heat exchanger. In one embodiment, the heat exchanger 270 includes one or more fins on the shell, the tube(s), or a combination thereof.

The cooled water mixture entering the water cooled condenser 228 cools, via the heat exchanger 270, the high pressure gas refrigerant entering the water cooled condenser 228 (e.g., at the second inlet 246 of the water cooled condenser 228) from the compressor 234. The warm water mixture exiting the water cooled condenser 228 (e.g., at the first outlet 244 of the water cooled condenser 228), and thus the water cooled ice maker 102 (e.g., at the outlet 116 of the water cooled ice maker 102), returns to the dry cooler 104 via the closed water loop 106.

The heat transfer from the water mixture at the heat exchanger 200 of the dry cooler 104, and the heat transfer to the water mixture at the heat exchanger 270 of the water cooled ice maker 102 are repeated with each cycle of the water mixture through the closed water loop 106.

The cooled refrigerant exiting the expansion valve 230 (e.g., via the water cooled condenser 228 at the second outlet 248 of the water cooled condenser 228) cools the evaporator 232 to make ice, as heat is transferred from water running through the evaporator 232 to the refrigerant flowing through the evaporator 232 via the closed refrigerant loop 240.

The heat transfer to the refrigerant at the evaporator 232 of the water cooled ice maker 102, and the heat transfer from the refrigerant at the heat exchanger 270 of the water cooled condenser 228 of the water cooled ice maker 102 are repeated with each cycle of the refrigerant through the closed refrigerant loop 240.

Figure 6:
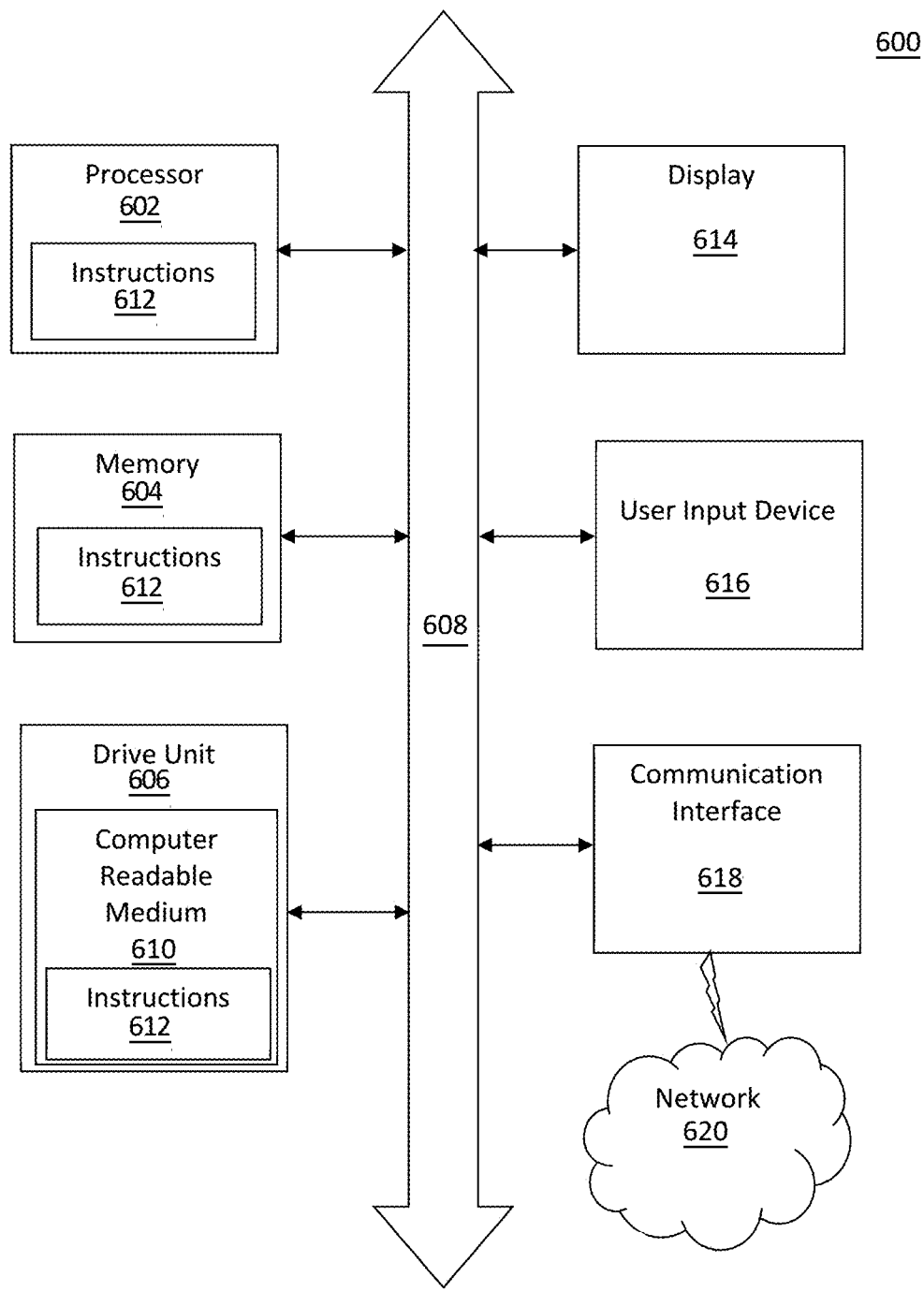
FIG. 6 shows one embodiment of a computer system for use with the remotely cooled ice machine of FIGS. 1, 2, and/or 5.

FIG. 6 shows one embodiment of a computer system that may be used with the remotely cooled ice machine of FIG. 1, 2, 5, and/or another remotely cooled ice machine. FIG. 6 shows an illustrative embodiment of a general computer system 600. The computer system 600 may include a set of instructions that may be executed to cause the computer system 600 to perform any one or more of the methods or computer based functions disclosed herein. The computer system 600 may operate as a standalone device or may be connected (e.g., using a network) to other computer systems or peripheral devices (e.g., sensors, pumps, compressors, fans, and/or other devices). Any of the components discussed above may be a computer system 600 or a component in the computer system 600. For example, the pressure sensor 302, pump 204, the first controller, the second controller, and/or one or more other devices of the remotely cooled ice machine 100 may be a computer system 600 or a component in the computer system 600. Additional, fewer, and/or different components of, for example, the remotely cooled ice machine 100 may be a computer system 600 or a component in the computer system 600.

In a networked deployment, the computer system 600 may operate in the capacity of a server or as a client user computer in a client-server user network environment, or as a peer computer system in a peer-to-peer (or distributed) network environment. The computer system 600 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a personal trusted device, a web appliance, a network router, switch or bridge, or any other machine capable of executing a set of instructions (sequential or otherwise) that specify actions to be taken by that machine. In one embodiment, the computer system 600 may be implemented using electronic devices that provide voice, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602 such as, for example, a central processing unit (CPU), a graphics-processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that may communicate via a bus 608. The memory 604 may be a main memory, a static memory, or a dynamic memory. The memory 604 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 604 includes a cache or random access memory for the processor 602. In alternative embodiments, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts, or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 600 may further include a display unit 614 (e.g., a display), such as a liquid crystal display (LCD), an organic light emitting diode (OLED), a flat panel display, a solid state display, a cathode ray tube (CRT), a projector, a printer or other now known or later developed display device for outputting determined information. The display 614 may act as an interface for the user to see the functioning of the processor 602, or specifically as an interface with the software stored in the memory 604 or in a disk or optical drive unit 606 (e.g., a disk drive unit).

Additionally, the computer system 600 may include an input device 616 configured to allow a user to interact with any of the components of the computer system 600. The input device 616 may be a number pad, a keyboard, or a cursor control device, such as a mouse, or a joystick, touch screen display, remote control or any other device operative to interact with the computer system 600. In other embodiments, the input device 616 includes a credit card reader, an RFID reader, and/or other devices.

In one embodiment, as depicted in FIG. 6, the computer system 600 may also include the disk or optical drive unit 606. The disk drive unit 606 may include a computer-readable medium 610, in which one or more sets of instructions 612 (e.g., software) may be embedded. Further, the instructions 612 may embody one or more of the methods or logic as described herein. In one embodiment, the instructions 612 may reside completely, or at least partially, within the memory 604 and/or within the processor 602 during execution by the computer system 600. The memory 604 and the processor 602 also may include computer-readable media as discussed above.

The present disclosure contemplates a computer-readable medium that includes instructions 612 or receives and executes instructions 612 responsive to a propagated signal, so that a device connected to a network 620 may communicate voice, video, audio, images or any other data over the network 620. Further, the instructions 612 may be transmitted or received over the network 620 via a communication port 618. The communication port 618 may be a part of the processor 602 or may be a separate component. The communication port 618 may be created in software or may be a physical connection in hardware. The communication port 618 is configured to connect with the network 620 or another network, external media, the display 614, any other components in the computer system 600, or combinations thereof. The connection with the network 620 may be a physical connection, such as a wired Ethernet connection or may be established wirelessly as discussed below. Likewise, the additional connections with other components of the computer system 600 may be physical connections or may be established wirelessly.

The network 620 may include wired networks, wireless networks, or combinations thereof. The wireless network may be a cellular telephone network, an 802.11, 802.16, 802.20, or WiMax network. Further, the network 620 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media (e.g., a centralized or distributed database and/or associated caches and servers that store one or more sets of instructions). The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In one embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A remotely cooled ice machine comprising:
an ice maker comprising:
a refrigerant line through which a refrigerant is configured to flow;
a compressor configured to compress the refrigerant and circulate the refrigerant through the refrigerant line in a closed refrigerant loop; and
a condenser configured to condense the compressed refrigerant; and
a thermal management device that is remote from the ice maker, the thermal management device comprising:
a coolant line through which a coolant is configured to flow, the coolant being different than the refrigerant;
a pump configured to circulate the coolant through the coolant line in a closed coolant loop;
a fan configured to move air through the thermal management device; and
a heat exchanger configured to transfer heat from the coolant to the air moved through the thermal management device,
wherein the coolant line fluidly connects the pump and the heat exchanger of the thermal management device and the condenser of the ice maker in the closed coolant loop,
wherein the thermal management device further comprises a pressure switch in communication with the pump, the fan, or the pump and the fan of the thermal management device,
wherein the pressure switch is configured to determine a pressure of the coolant in the coolant line, at an inlet of the heat exchanger of the thermal management device, and
wherein the pressure switch is configured to turn off the pump, the fan, or the pump and the fan when the determined pressure of the coolant in the coolant line is greater than a predetermined threshold pressure, such that heat transfer between the air moved through the thermal management device and the coolant in the coolant line is controllable without a direct electrical connection from the thermal management device to the ice maker.

2. The remotely cooled ice machine of claim 1, wherein the ice maker further comprises:
an expansion valve configured to reduce a pressure of the condensed refrigerant, such that the condensed refrigerant is cooled; and
an evaporator configured to freeze water and make ice using the cooled refrigerant,
wherein the refrigerant line fluidly connects the compressor, the condenser, the expansion valve, and the evaporator in the closed refrigerant loop.

3. The remotely cooled ice machine of claim 2, wherein a first portion of the coolant line fluidly connects an outlet of the thermal management device to a first inlet of the condenser, and a second portion of the coolant line fluidly connects a first outlet of the condenser to an inlet of the thermal management device,
wherein a first portion of the refrigerant line fluidly connects the compressor to a second inlet of the condenser, and a second portion of the refrigerant line fluidly connects a second outlet of the condenser to the expansion valve,
wherein the ice maker further comprises:
a regulator in line with the first portion of the coolant line or the second portion of the coolant line; and
a pressure sensor configured to determine a pressure of the refrigerant within the first portion of the refrigerant line,
wherein the regulator is configured to control a flow of the coolant through the coolant line based on the determined pressure of the refrigerant within the first portion of the refrigerant line.

4. The remotely cooled ice machine of claim 3, wherein the regulator is a first regulator,
wherein the thermal management device further comprises a second regulator in line with the coolant line, downstream of the pump, and
wherein the second regulator is configured to control the flow of the coolant through the first portion of the coolant line based on an operating pressure window of the first regulator.

5. The remotely cooled ice machine of claim 1,
wherein the condenser of the ice maker comprises a heat exchanger, and
wherein the heat exchanger of the condenser of the ice maker is configured to transfer heat from the compressed refrigerant in the refrigerant line to the coolant in the coolant line.

6. The remotely cooled ice machine of claim 5, wherein the thermal management device is a dry cooler fluidly coupled to the ice maker via the coolant line and the condenser.

7. The remotely cooled ice machine of claim 1, wherein the coolant is a mixture of water and Glycol.

8. The remotely cooled ice machine of claim 1, wherein the thermal management device further comprises a reservoir fluidly connected to the heat exchanger and the pump via the coolant line,
wherein the coolant is addable to the closed coolant loop via the reservoir.

9. A remotely cooled ice machine comprising:
an ice maker comprising:
a refrigerant line through which a refrigerant is configured to flow;
a compressor configured to compress the refrigerant and circulate the refrigerant through the refrigerant line in a closed refrigerant loop; and
a condenser configured to condense the compressed refrigerant; and
a thermal management device that is remote from the ice maker, the thermal management device comprising:
a coolant line through which a coolant is configured to flow, the coolant being different than the refrigerant;
a pump configured to circulate the coolant through the coolant line in a closed coolant loop;
a fan configured to move air through the thermal management device; and
a heat exchanger configured to transfer heat from the coolant to the air moved through the thermal management device,
wherein the coolant line fluidly connects the pump and the heat exchanger of the thermal management device and the condenser of the ice maker in the closed coolant loop,
wherein the ice maker further comprises:
an expansion valve configured to reduce a pressure of the condensed refrigerant, such that the condensed refrigerant is cooled; and an evaporator configured to freeze water and make ice using the cooled refrigerant, wherein the refrigerant line fluidly connects the compressor, the condenser, the expansion valve, and the evaporator in the closed refrigerant loop, wherein a first portion of the coolant line fluidly connects an outlet of the thermal management device to a first inlet of the condenser, and a second portion of the coolant line fluidly connects a first outlet of the condenser to an inlet of the thermal management device, wherein a first portion of the refrigerant line fluidly connects the compressor to a second inlet of the condenser, and a second portion of the refrigerant line fluidly connects a second outlet of the condenser to the expansion valve, wherein the ice maker further comprises:
 a regulator in line with the first portion of the coolant line or the second portion of the coolant line; and
 a pressure sensor configured to determine a pressure of the refrigerant within the first portion of the refrigerant line, and wherein the regulator is configured to control a flow of the coolant through the coolant line based on the determined pressure of the refrigerant within the first portion of the refrigerant line.

10. The remotely cooled ice machine of claim 9, wherein the regulator is a first regulator, wherein the thermal management device further comprises a second regulator in line with the coolant line, downstream of the pump, and wherein the second regulator is configured to control the flow of the coolant through the first portion of the coolant line based on an operating pressure window of the first regulator.

11. The remotely cooled ice machine of claim 9, wherein the condenser of the ice maker comprises a heat exchanger, and wherein the heat exchanger of the condenser of the ice maker is configured to transfer heat from the compressed refrigerant in the refrigerant line to the coolant in the coolant line.

12. The remotely cooled ice machine of claim 11, wherein the thermal management device is a dry cooler fluidly coupled to the ice maker via the coolant line and the condenser.

13. The remotely cooled ice machine of claim 9, wherein the coolant is a mixture of water and Glycol.

14. The remotely cooled ice machine of claim 9, wherein the thermal management device further comprises a reservoir fluidly connected to the heat exchanger and the pump via the coolant line, wherein the coolant is addable to the closed coolant loop via the reservoir.

* * * * *